Aug. 18, 1925.
H. J. BRADT
DEMOUNTABLE RIM FOR VEHICLE WHEELS
Filed April 14, 1922
1,550,145
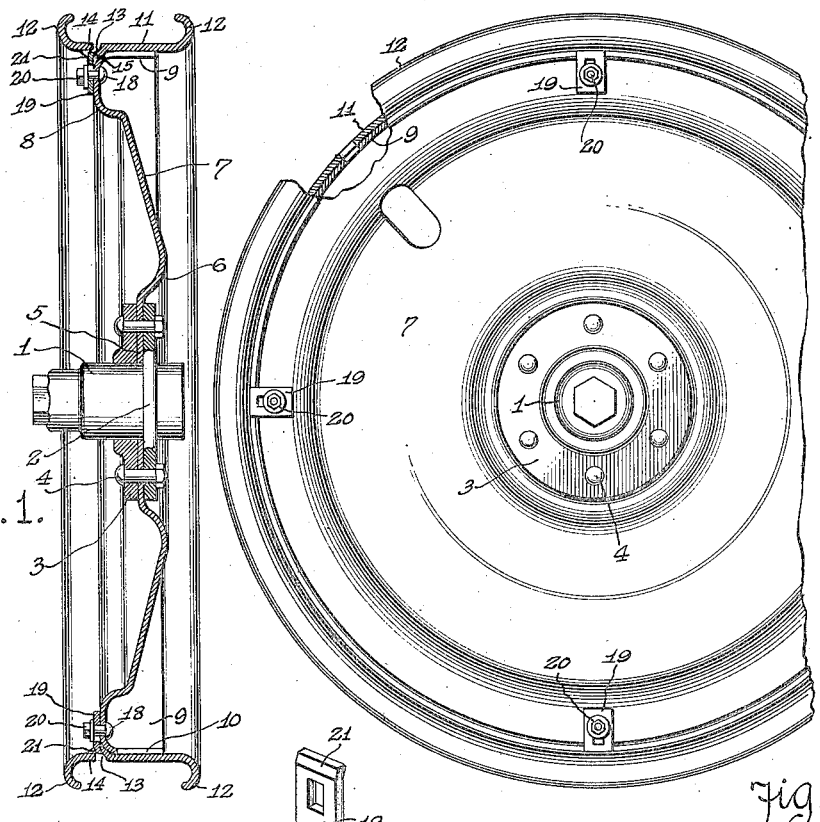
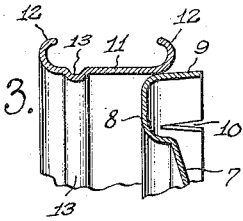
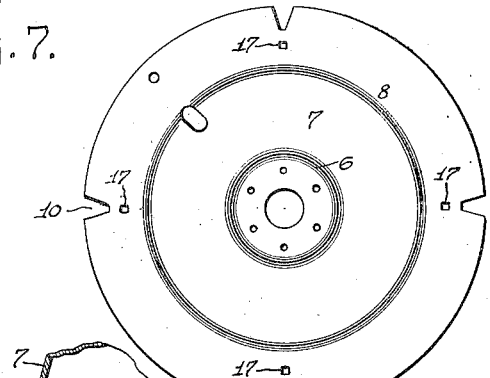
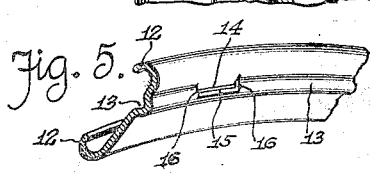
Inventor
Harold J. Bradt,
Attorney Patented Aug. 18, 1925.

1,550,145

UNITED STATES PATENT OFFICE.

HAROLD J. BRADT, OF ROCHESTER, MICHIGAN.

DEMOUNTABLE RIM FOR VEHICLE WHEELS.

Application filed April 14, 1922. Serial No. 552,573.

*To all whom it may concern:*

Be it known that I, HAROLD J. BRADT, a citizen of the United States of America, residing at Rochester, in the county of Oakland and State of Michigan, have invented certain new and useful Improvements in Demountable Rims for Vehicle Wheels, of which the following is a specification, reference being had therein to the accompanying drawings.

My invention has reference to that class of disk vehicle wheels which are provided with demountable rims permitting of a punctured or injured tire being easily and quickly replaced by another tire.

The primary object of my invention is to provide a disk with a radial expansible flange or periphery on which a tire supporting rim may be mounted and safely held against lateral displacement and circumferential creeping during rotation of the wheel. Another object of my invention is to provide a disk wheel body on which a tire supporting rim may be mounted and novel fasteners are carried by the disk body for engaging the tire supporting rim to positively secure said rim relative to the disk body.

A further object of this invention is to accomplish the above results by a metallic wheel structure possessing a desired degree of resiliency and the construction entering into the wheel will be hereinafter specifically described and then claimed.

Reference will now be had to the drawing, wherein

Figure 1 is a vertical sectional view of a wheel in accordance with my invention;

Fig. 2 is a side elevation of a portion of the same;

Fig. 3 is a cross sectional view of a portion of the wheel illustrating the manner of mounting a tire supporting rim on the periphery or flange of a disk body;

Fig. 4 is an enlarged view of the same showing one of the fasteners;

Fig. 5 is a perspective view of a portion of the tire supporting rim;

Fig. 6 is a similar view showing an air tube for a tire;

Fig. 7 is a perspective view of a detached fastener, and

Fig. 8 is a side elevation of a detached disk body.

In the drawing, the reference numeral 1 denotes a conventional form of hub having a peripheral flange 2 and surrounding the hub 1 against the flange 2 is a disk body held by a detachable member 3 and nut equipped bolts 4 or other fastening means, so that the disk body is fixed relative to the hub.

The disk body is designated 5 and outside of its central portion, which is held by the hub, said disk body is dished or convexo concave so as to provide a yieldable web portion which includes a curved wall 6 and an angularly disposed wall 7. Considering this wall in cross section it is at an obtuse angle relative to the axis of the hub 1 and at an acute angle relative to the plane of rotation of the wheel and when pressure is brought to bear centrally of the disk body, for instance by a load supported by the hub 1, the disk body possesses a degree of resiliency since it may be sprung to have the curved wall 6 flexed inwardly and the inclined wall 7 outwardly, this taking place at diametrically opposed points in a plane at a right angle to the plane of the load depression on the disk body.

The peripheral edges of the annular wall or web 7 are integral with a flat wall 8 in the plane of rotation of the wheel and said flat wall has an inturned annular flange 9 having its edge notched, split or otherwise cut away, at intervals, as at 10, thus permitting of the flange 9 being contracted or distended. In pressing, rolling or otherwise producing the disk body the flange 9 is disposed at an obtuse angle relative to the flat wall 8, such angle approaching that of a right angle relative to the wall 8, so that the flange 9 may be forcibly contracted to assume a position at substantially a right angle to said wall and when the flange is under such compression or retraction it has an inherent tendency to radially expand and produce an outward radial pressure which is taken advantage of for anchoring a tire supporting rim 11 on the disk body.

The tire supporting rim 11 has the usual and well known clencher edges 12 for retaining the outer casing of a tire on the rim and in forming said rim I provide the same with an annular inwardly extending bead 13, which, at intervals, has its outer portion cut away to provide recesses 14 presenting three shoulders or walls 15 and 16.

As shown in Figs. 3 and 4 the tire supporting rim 11 may be laterally forced on to the flange 9, said flange being contracted and forced into a position substantially at a right angle to the wall 8 and when in such position it produces a constant pressure against the inner wall of the rim 11. The mounting on movement of the rim 11 is limited by the bead 13 engaging the wall 8 and said wall has a plurality of openings 17 to receive non-rotatable bolts 18. On the rectangular shanks of these bolts are placed fasteners or clips 19 which are non-rotatably held against the wall 8 by nuts 20 screwed on the bolts 18. The fasteners or clips 19 have angular ends 21 engaging the shoulders 15 and 16 of the recesses 14 with the shoulders 15 preventing lateral displacement of the rim 11 and the shoulders 16 preventing circumferential creeping. The tire supporting rim 11 is positively anchored relative to the disk body and by loosening the nuts 20 the fasteners or clips 19 may recede or be manually retracted to permit of the rim 11 being withdrawn from the periphery of the disk body.

The rim 11, flange 9 and wall 7 have openings, as shown in Fig. 6, providing clearance for a tire inflating tube or connection 21.

One embodiment of my invention has been illustrated, but it is to be understood that the structural elements are susceptible to such variations and modifications as fall within the scope of the appended claims.

What I claim is:—

1. In a disk wheel, a disk body having an annular split expansible flange, and a tire supporting rim adapted to be mounted on the flange of said disk body to contract said flange so that its expansive force will bind said rim on the disk body.

2. As a new article of manufacture, a disk body portion adapted for use as the disk of a disk wheel formation and wherein the tire supporting rim and disk are adapted to have a mutual gripping relation therebetween, such disk body having a flange portion of greater diameter than the internal diameter of the rim to which it is applied and having a configuration which permits the flange to be reduced in external diameter by the assembling of rim and disk, the change in flange diameter by the assembly producing an expansive force characteristic to the flange to maintain a gripped relation between flange and rim.

3. In a disk wheel, a disk body having a wall with an annular split expansible flange, a demountable rim on the flange of said body wall and bound thereon by the flange being under compression, and fasteners carried by the wall of said disk body and engaging said rim to anchor said rim relative to said disk body.

In testimony whereof I affix my signature.

HAROLD J. BRADT.